(12) United States Patent
Williams et al.

(10) Patent No.: US 12,397,372 B2
(45) Date of Patent: Aug. 26, 2025

(54) ADDITIVE MANUFACTURE

(71) Applicant: WAAM3D Limited, Buckinghamshire (GB)

(72) Inventors: Stewart Wynn Williams, Cranfield (GB); Wojciech Jerzy Suder, Cranfield (GB)

(73) Assignee: WAAM3D Limited, Buckinghamshire (GB)

( * ) Notice: Subject to any disclaimer, the term of this patent is extended or adjusted under 35 U.S.C. 154(b) by 1011 days.

(21) Appl. No.: 17/269,654

(22) PCT Filed: Jul. 19, 2019

(86) PCT No.: PCT/EP2019/069595
§ 371 (c)(1),
(2) Date: Feb. 19, 2021

(87) PCT Pub. No.: WO2020/038671
PCT Pub. Date: Feb. 27, 2020

(65) Prior Publication Data
US 2021/0252642 A1 Aug. 19, 2021

(30) Foreign Application Priority Data

Aug. 24, 2018 (GB) .................................. 1813834

(51) Int. Cl.
*B23K 26/342* (2014.01)
*B22F 10/28* (2021.01)
(Continued)

(52) U.S. Cl.
CPC ............ *B23K 26/342* (2015.10); *B22F 10/28* (2021.01); *B22F 12/13* (2021.01); *B22F 12/45* (2021.01);
(Continued)

(58) Field of Classification Search
CPC .............. B23K 26/342; B23K 26/0608; B23K 26/0626; B23K 26/08; B33Y 10/00;
(Continued)

(56) References Cited

U.S. PATENT DOCUMENTS

2002/0166896 A1* 11/2002 Mazumder ............. B33Y 10/00
235/487
2007/0023403 A1* 2/2007 Emiljanow .......... B23K 26/032
219/121.64
(Continued)

FOREIGN PATENT DOCUMENTS

CN 104985327 A 10/2015
EP 3184208 6/2017
(Continued)

OTHER PUBLICATIONS

International Search Report and Written Opinion, International Application No. PCT/EP2019/069595, mailed on Oct. 9, 2019, 13 pages.
(Continued)

*Primary Examiner* — Elizabeth M Kerr
*Assistant Examiner* — Simpson A Chen
(74) *Attorney, Agent, or Firm* — Quarles & Brady LLP (57) ABSTRACT

A method of producing a 3D article by additive manufacture is provided. The method includes the steps of: forming a meltpool in an already-existing part of the article, and moving the meltpool relative thereto; feeding a directed feedstock into the moving meltpool to deposit and fuse a layer of material on the already-existing part; and repeating the forming and moving and feeding steps to build up successive layers of material. In performance of the forming and moving step: a first energy source impinges at a first region of the already-existing part which moves with and leads the meltpool, whereby the first energy source initiates
(Continued)

the formation of the meltpool; and a second energy source impinges at a second region on the already-existing part which moves with and follows the first region, whereby the second energy source grows the lateral width of the meltpool before the feedstock is fed therein.

17 Claims, 4 Drawing Sheets

(51) Int. Cl.
*B22F 12/13* (2021.01)
*B22F 12/45* (2021.01)
*B22F 12/47* (2021.01)
*B22F 12/50* (2021.01)
*B23K 26/06* (2014.01)
*B23K 26/08* (2014.01)
*B33Y 10/00* (2015.01)
*B33Y 30/00* (2015.01)

(52) U.S. Cl.
CPC .............. *B22F 12/47* (2021.01); *B22F 12/50* (2021.01); *B23K 26/0608* (2013.01); *B23K 26/0626* (2013.01); *B23K 26/08* (2013.01); *B33Y 10/00* (2014.12); *B33Y 30/00* (2014.12)

(58) Field of Classification Search
CPC .......... B33Y 30/00; B22F 12/45; B22F 12/50; B22F 12/13; B22F 12/47; B22F 10/28
USPC ..................................................... 219/121.62
See application file for complete search history.

(56) References Cited

U.S. PATENT DOCUMENTS

| | | | | |
|---|---|---|---|---|
| 2011/0215074 A1* | 9/2011 | Wang | ................... | B23K 26/348 |
| | | | | 219/121.64 |
| 2013/0105447 A1* | 5/2013 | Haake | ................. | B23K 26/144 |
| | | | | 219/76.14 |
| 2014/0008334 A1* | 1/2014 | Ash | .......................... | B23K 9/04 |
| | | | | 219/121.64 |
| 2016/0318130 A1* | 11/2016 | Stempfer | ............... | B23K 9/167 |
| 2017/0304923 A1 | 10/2017 | Ash | | |
| 2017/0341180 A1 | 11/2017 | Zediker et al. | | |
| 2017/0368637 A1* | 12/2017 | Giese | ................... | B23K 26/211 |
| 2019/0176267 A1* | 6/2019 | Crews | ................ | B23K 26/1476 |

FOREIGN PATENT DOCUMENTS

| | | | | |
|---|---|---|---|---|
| EP | 3196001 | | 7/2017 | |
| WO | WO-2006/133034 | | 12/2006 | |
| WO | WO-2006133034 A1 * | 12/2006 | ......... | B23K 26/0093 |

OTHER PUBLICATIONS

UKIPO Search Report, Application No. GB113834.7, dated Jan. 23, 2019, 5 pages.

Chinese First Office Action, Application No. 201980056006.1, dated Mar. 16, 2022, 14 pages. Machine translation.

IP India Office Action, Application No. 202117007315, dated Sep. 13, 2022, 6 pages. English translation.

* cited by examiner

ADDITIVE MANUFACTURE

RELATED APPLICATIONS

This application is a 35 U.S.C. § 371 national phase application of PCT/EP2019/069595 (WO-2020-038671-A1), filed on Jul. 19, 2019, entitled "ADDITIVE MANUFACTURE", which application claims the benefit of GB Patent Application No. 1813834.7, filed Aug. 24, 2018, each of which are incorporated herein by reference in entirety.

FIELD OF THE PRESENT DISCLOSURE

The present disclosure relates to a method and a system for producing 3D articles by additive manufacture.

BACKGROUND

Additive Manufacture (AM) is a technology that enables the creation of near net-shape 3D articles, typically based on a computer aided design (CAD) software model of the article. AM involves the deposition and fusing of multiple successive layers of one or more materials, such as metals, to build up the article. Significant advantages of AM, when compared to conventional methods of manufacturing 3D articles, such as casting or machining, include a reduction in production time and a reduction in the "buy-to-fly ratio", i.e. the weight of material that needs to be purchased relative to the weight of that material in final manufactured part. The reduced material consumption, in particular, helps to reduce overall production costs.

In AM, the material from which the 3D article is to be made, i.e. the feedstock, is supplied to a specified location where it enters a meltpool formed on a substrate. The location of the meltpool is continuously moved around on the substrate. The melted feedstock layer fuses to the substrate, and further successive layers of material are then deposited in a similar manner on the previously deposited layers, to build up the 3D article. The substrate can be an already-existing component, onto which new features are added by AM.

Generally, an energy source such as a plasma arc, an electron beam or a laser is used to form the meltpool. This energy source can also be used to provide the energy to melt the feedstock as it enters the meltpool and to govern the overall temperature of the process (and therefore govern the cooling conditions and the microstructure and mechanical properties of the 3D article).

Good control of the shape of each layer of deposited material, also known as the bead shape, is important for the production of a near net-shape 3D article. The single bead width (SBW), i.e. the width of a layer of deposited material, determines process resolution; the contact angle (CA) between a new layer and a previous layer determines likelihood of lack of fusion defects between layers; and the layer height (LH) determines surface finish. Each of these bead shape parameters is dependent on the power and energy profile of the energy source. Thus, control of the energy source and/or the feed rate of the feedstock to change the LH, will also change the SBW and the CA. Accordingly, adjusting the process to improve the LH may lead to a deterioration in SBW and/or CA, for example.

In practice, the AM process may be optimised using e.g. statistical analysis or neural networks to find a suitable balance of the bead shape parameters which produce a near net-shape article using the heat source. However, this can render the AM process inflexible and unadaptable, because the bead shape, the deposition rate of feedstock material and the overall temperature of the process cannot be independently controlled. Alternatively, the process may not be sufficiently optimisable to produce the near net-shape article accurately enough, or without fusion defects.

Accordingly, it would be advantageous to provide a method of producing an article by AM capable of independent control of bead shape, deposition rate of feedstock material and overall temperature of the process in order to produce near net-shape articles at high build rates.

SUMMARY

According to a first aspect, there is provided a method of producing a 3D article by additive manufacture, wherein the method includes the steps of:
   forming a meltpool in an already-existing part of the article, and moving the meltpool relative thereto;
   feeding a directed feedstock into the moving meltpool to deposit and fuse a layer of material on the already-existing part; and
   repeating the forming and moving and feeding steps to build up successive layers of material, and thereby produce the 3D article; and
   wherein, in performance of the forming and moving step:
   a first energy source is directed onto the already-existing part, the first energy source impinging at a first region which moves with and leads the meltpool, whereby the first energy source initiates the formation of the meltpool; and
   a second energy source is directed onto the already-existing part, the second energy source impinging at a second region which moves with and follows the first region, whereby the second energy source grows the lateral width of the meltpool before the feedstock is fed therein.

The already-existing part of the article may be a substrate (e.g. an article produced by another manufacturing method prior to the additive operation) on which the layers are to be deposited, or it may be a previously fused layer of material.

By using first and second energy sources, roles conventionally performed by a single AM energy source can be decoupled, whereby desired attributes in the resultant article can be attained, without deterioration of other attributes. Specifically, as the first energy source initiates the meltpool and the second energy source grows the meltpool width to a desired size, single bead width (and therefore resolution) can be controlled independently relative to the total energy being input into the process. This allows the total energy to be adjusted, e.g. to accommodate local changes in thermal mass and to control cooling conditions and hence the microstructure of the article, while separately controlling resolution. As a result, improved net-shaping of the 3D article can be achieved at a faster build rate.

Optional features of the present disclosure will now be set out. These are applicable singly or in any combination with the first aspect of the disclosure.

The first energy source may also be used to control an initial size of the meltpool and/or the overall energy of the process. The second energy source may grow the lateral width of the meltpool independently of its depth. Thus, preferably, the second energy grows the meltpool width only, and does not substantially grow its depth.

The first energy source may be a plasma transferred arc. Plasma transferred arcs can provide efficient coupling of the applied energy into the substrate and/or previously fused layers, but their energy spatial profile is generally limited to within a relatively narrow range. Accordingly, plasma transferred arcs are especially suitable for functions of the first energy source; specifically for efficiently initiating the formation of the meltpool and for performing accurate control of the overall energy of the process. As the first energy source does not need to grow the meltpool or control its size or shape, the limited energy spatial profile of plasma transferred arcs is not problematic.

The second energy source may be one or more lasers. Laser energy sources are especially suitable for use as the second energy source, because they offer a high level of control of spatial and temporal energy profiles and so can accurately grow and shape the meltpool.

Optionally, the energy profile of the impinging energy of the second energy source may be weighted to opposite lateral sides of the meltpool. In this way, the meltpool can efficiently grow to a desired width in order to provide bead width control without significantly affecting the depth of the meltpool.

Additionally, or alternatively, the energy profile and/or the power of the impinging energy of the second energy source may be adjusted to vary the lateral growth of the meltpool. Indeed, the overall meltpool shape and size can be adjusted by appropriate control of the second energy source to produce different bead widths without causing deterioration of other desired attributes.

The feedstock may be a wire or tape. For example, the feedstock may be a round wire, a flat tape, or have some other shape. The feedstock may be formed from a metal or metal alloy.

The method may include the further step of impinging a third energy source onto the directed feedstock to melt the feedstock as it is fed into the moving meltpool. In this way, the feedstock can be melted using an energy source which can also be independently controlled, such that any changes in the energy profile and/or the power of the impinging energy of the third energy source do not affect the initiation and/or growth (and therefore shape) of the meltpool.

When the method involves a third energy source, the third energy source may be one or more lasers. As previously mentioned, laser energy sources advantageously offer a high level of control of spatial and temporal energy profiles.

When the method involves a third energy source, the energy profile of the impinging energy of the third energy source may be adjusted to compensate for changes in the shape, size (i.e. width) and/or feed rate of the feedstock. Accordingly, the feedstock can be melted efficiently and uniformly, leading to faster build rates, without affecting the other desired attributes of the bead shape.

Additionally or alternatively, the power of the third energy source may be adjusted to compensate for changes in the feed rate of the feedstock. Accordingly, if the feed rate of the feedstock is adjusted to change a height of a layer or to increase build rate, the third energy source can compensate for this change to ensure efficient and uniform melting of the feedstock is maintained. Further, as the third energy source can be independently controllable from the first and second energy sources, any change in the power of the third energy source does not affect layer width, or overall temperature control of the process. Therefore, build rate of the 3D article can be increased, and layer height can be adjusted without having a detrimental effect on other desired attributes of the bead shape.

For example, when the feed rate of the feedstock increases, the energy profile of the impinging energy of the third energy source may be adjusted by extending the length of the profile in the feed direction of the directed feedstock while increasing the power of the third energy source. In this way, the power density of the third energy source at a given point on the feedstock can be maintained to ensure melting through the thickness of the feedstock, whilst limiting or avoiding vaporisation of material from the upper surface of the feedstock. Similarly, when the feed rate of the feedstock decreases, the energy profile of the impinging energy of the third energy source may be adjusted by reducing the length of the profile in the feed direction of the directed feedstock while decreasing the power of the third energy source.

The method may further include the step of preheating the feedstock. The preheating may be achieved by resistive or inductive heating, for example. Another option is to preheat the feedstock using a non-transferred plasma arc power source, which can also help to clean the feedstock.

The method may further include the step of cryogenically cooling the already-existing part of the article. In this way, cooling rates of the deposited material can be enhanced in order to improve the microstructure of the 3D article. Productivity may also be increased.

According to a second aspect, there is provided a system for producing a 3D article by additive manufacture in which a meltpool is formed in an already-existing part of the article, and moved relative thereto, a directed feedstock is fed into the moving meltpool to deposit and fuse a layer of material on the already-existing part, and the forming and moving and feeding are repeated to build up successive layers of material, and thereby produce the 3D article, the system comprising:

a first energy source configured to be directed onto the already-existing part;

a second energy source configured to be directed onto the already-existing part;

a feedstock directing arrangement; and a computer controller adapted (i.e. programed) to control movement of the first energy source, the second energy source and the feedstock directing arrangement relative to the already-existing part such that: the first energy source impinges at a first region which moves with and leads the meltpool whereby the first energy source initiates the formation of the meltpool, the second energy source impinges at a second region which moves with and follows the first region to grow the lateral width of the meltpool before receipt of the directed feedstock into the moving meltpool, and the directed feedstock is fed into the moving meltpool.

Thus the system of the second aspect corresponds to the method of the first aspect of the disclosure. Accordingly, the system may have, to the extent that they are compatible, any one or any combination of the optional features corresponding to those set out above in respect of the first aspect.

For example, the energy profile and/or the power of the impinging energy of the second energy source may be adjustable to vary the lateral growth of the meltpool. Thus, different bead widths can be produced without causing deterioration of other desired attributes.

As another example, the system may further comprise a third energy source, wherein the computer controller is further adapted to control movement of the third energy source relative to the already-existing part such that the third energy source impinges the directed feedstock to melt the feedstock as it is fed into the moving meltpool.

When there is a third energy source, the computer controller may be further adapted to adjust the energy profile of the impinging energy of the third energy source to compensate for changes in the shape and/or size (e.g. width) of the feedstock. The computer controller may be further adapted to adjust the power of the third energy source to compensate for a change in the feed rate of the feedstock.

BRIEF DESCRIPTIONS OF THE DRAWINGS

Embodiments of the present disclosure will now be described by way of example only with reference to the accompanying drawings in which.

DETAILED DESCRIPTION AND FURTHER OPTIONAL FEATURES

Figure 1:
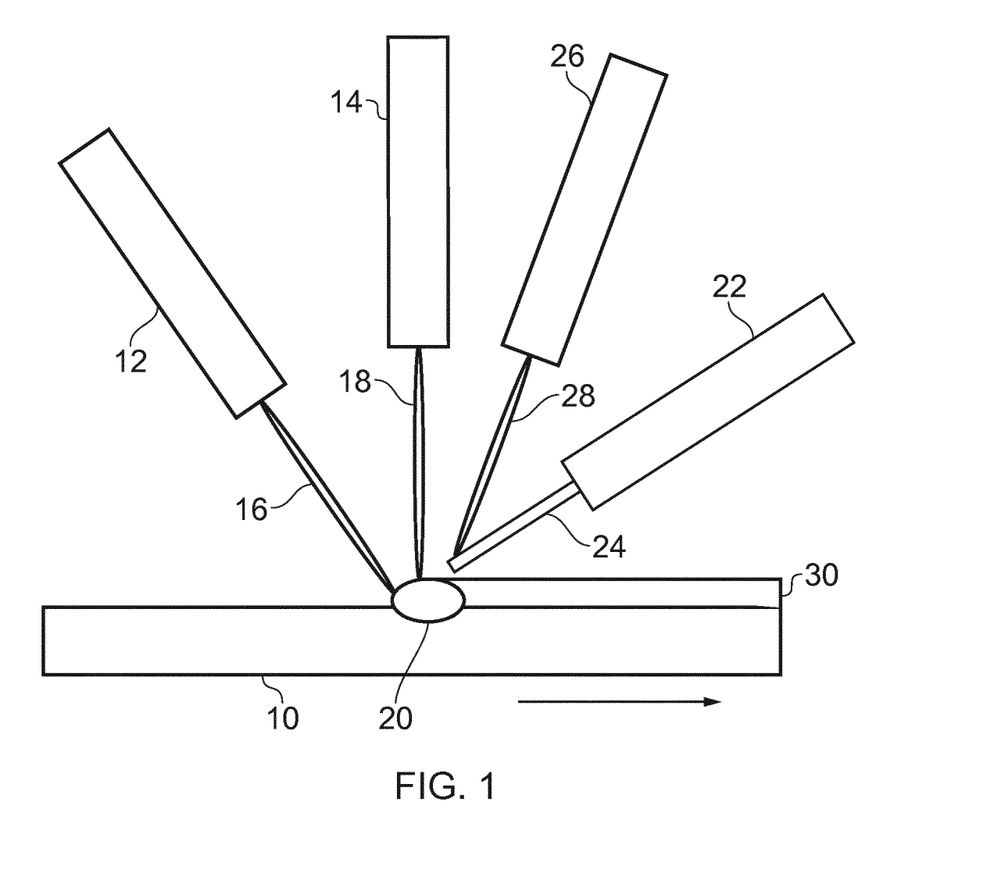
FIG. 1 shows a schematic drawing showing a system for producing a 3D article by additive manufacture.

FIG. 1 shows a system for producing a 3D article by AM. The article includes a substrate 10 onto which successive layers of the 3D article are built up. The substrate 10 is typically made of a metal or a metal alloy, and after the AM production is completed the substrate 10 may be retained in whole or in part as a portion of the final 3D article or it may be removed.

A computer controller (not shown) is configured to direct a first energy source 12 and a second energy source 14 onto the substrate 10. The first energy source 12 is conveniently a plasma transferred arc torch. Typically this has an electrical connection to a power source such that an electrode of the torch 12 becomes the cathode and the substrate 10 becomes the anode with a plasma transferred arc 16 formed between them. The plasma transferred arc 16 heats the substrate 10 to initiate the formation of a meltpool 20. In a variant of this process, an AC plasma torch is used, with a suitable balance of electrode positive and negative (typically about 20% positive). The variant can be beneficial e.g. for aluminium or aluminium alloy AM.

The second energy source 14 is conveniently a first laser configured to direct a laser beam 18 towards the substrate 10 at a region following behind the region where the plasma transferred arc 16 impinges the substrate 10 in order to grow the lateral width of the meltpool 20. As another option, the second energy source 14 may be two or more first lasers configured to direct respective laser beams 18 towards the meltpool 20.

The computer controller also controls a wire directing arrangement 22 to continuously supply a wire 24 made from the metal or metal alloy from which the article is to be formed, to a position above the meltpool 20.

A second laser 26 provides a third energy source under the control of the computer controller. A laser beam 28 from the second laser 26 is directed onto an end of the wire 24 positioned above the meltpool 20 in order to melt the wire 24 as it is fed into the meltpool 20. The feed rate of the wire 24 through the wire directing arrangement 22 is also controlled by the computer controller.

The plasma transferred arc torch 12, first laser 14, second laser 26 and wire directing arrangement 22 are configured to move relative to the substrate 10 (shown by the arrow in FIG. 1). This relative movement may be achieved by moving the energy sources 12, 14, 26 and the wire directing arrangement 22 relative to a static substrate 10, or by moving the substrate 10 relative to static energy sources 12, 14, 26 and a static wire directing arrangement 22. Either way, the meltpool 20 moves over the substrate 10 or over previously formed layers on the substrate by virtue of the relative movement.

As the meltpool 20 moves along the substrate, and the wire 24 is continuously fed to a position above the moving meltpool 20 for deposition into the meltpool 20, a layer of material 30 fuses onto the substrate 10. Once a layer 30 has formed on the substrate 10, the process repeats such that a moving meltpool is formed in a previously fused layer 30 and material is deposited from the wire 24 into that meltpool to form successive layers of material on the substrate until the 3D article modelled by a CAD drawing is completed.

Figure 2:
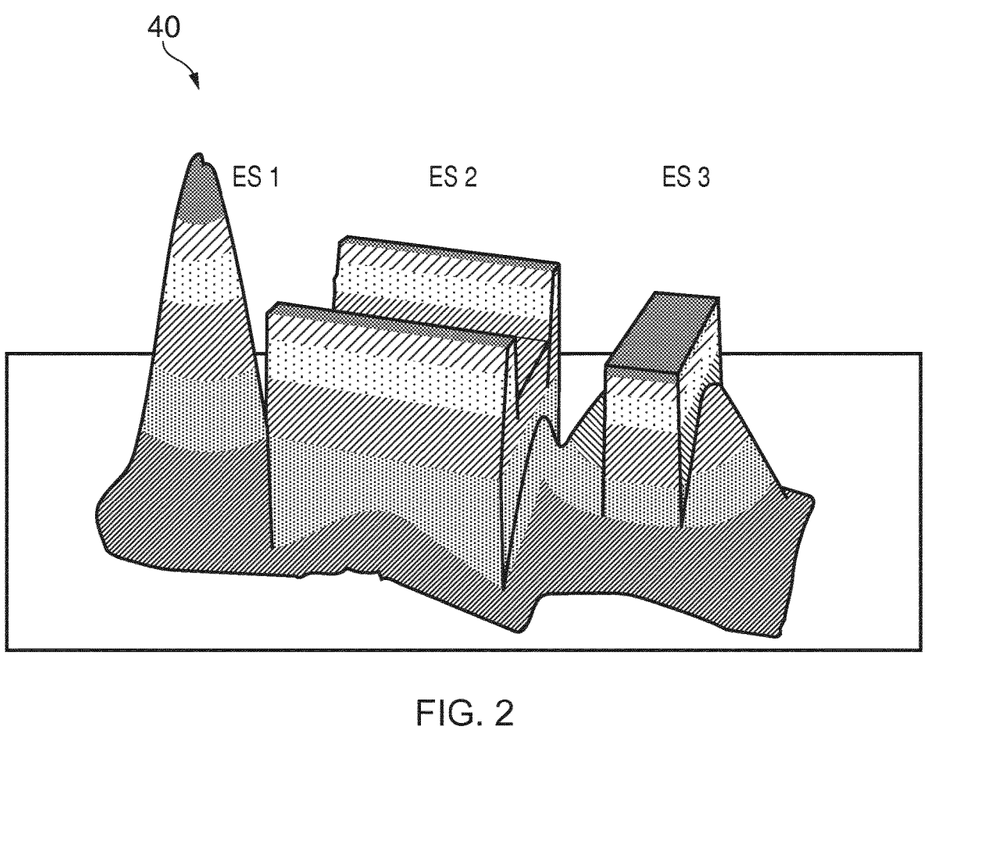
FIG. 2 shows combined energy profiles of multiple energy sources used in the system of FIG. 1.

FIG. 2 shows a combined energy profile 40 of the first, second and third energy sources 12, 14, 26 used in the system of FIG. 1. The first, second and third energy sources 12, 14, 26 have energy profiles ES1, ES2 and ES3 respectively.

The power of the first energy source 12, and therefore the magnitude of the energy profile ES1, can be varied to control the overall energy and temperature of the process, as well as the initial size and shape of the meltpool. Accordingly, the process can be adapted for 3D articles made of different materials; specifically to control varying cooling conditions, and the microstructure and mechanical properties of articles made from different materials.

Figure 3:
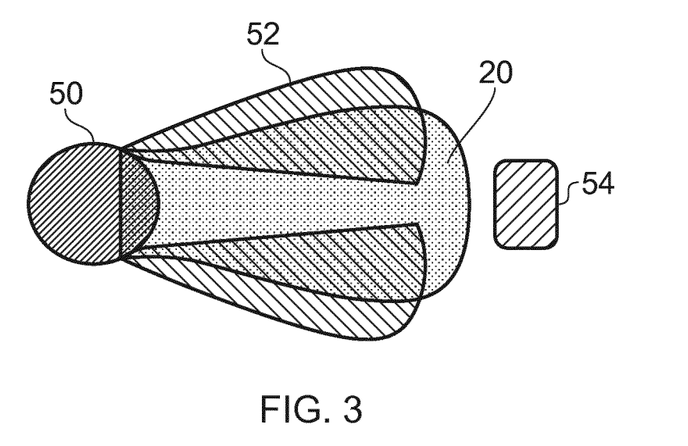
FIG. 3 shows a schematic representation of the impinging energy from the multiple energy sources used in the system of FIG. 1.

The shape of energy profile ES2 of the second energy source 14 can be adapted to control the shape of the meltpool 20. In order to grow the lateral width of the meltpool 20, the energy profile ES2 of the second energy source 14 is weighted to opposite lateral sides of the meltpool 20. This is further illustrated in FIG. 3, which shows a schematic view of the impinging energy 50 of the first energy source 12, the highest intensity regions of impinging energy 52 of the second energy source 14, and the impinging energy 54 of the third energy source 26. As shown in FIG. 3, weighting the impinging energy 52 of the second energy source 14 to opposite lateral sides of the meltpool 20, results in a growth of meltpool width. One way of achieving energy profile ES2 is to use two independent laser sources, wherein the impinging energies 52 of these two laser sources overlap the existing meltpool 20 at its opposing sides in order to sustain its depth whilst growing its width.

In general, the complex energy profile ES2 of the second energy source 14 may be achieved in various ways, such as refractory beam shaping optics, one or more lasers combined with one or more scanning galvo systems, or an addressable array of individual lasers.

In order to vary the bead width within each layer of deposited material, or between successive layers of deposited material, the shape of the energy profile ES2 and/or the power of the second energy source 14 can be adjusted to vary the shape of the meltpool.

The shape of energy profile ES3 of the third energy source 26 can be matched to the cross-sectional shape of the wire 24 in order to ensure efficient and uniform melting of the wire 24 by the laser beam 28 of the third energy source 26. As previously mentioned, the feed rate of the wire 24 can be varied to control the LH within and/or between each layer of deposited material and in order to determine the overall build time of the 3D article. The shape of the energy profile ES3 and/or the power of the third energy source 26 can also be controlled to correspond to the feed rate of the wire 24. For example, a wire with a larger diameter may require a larger spatial energy profile ES3 with an increased power in order to efficiently melt the wire without reducing the feed rate.

In particular, the length of the energy profile ES3 of the third energy source 26 can adjusted in the feed direction of the wire 24 in tandem with changing the power of the third energy source 26 to compensate for changes in feed rate of the wire 24. Accordingly, if the feed rate of the wire 24 is increased, the power of the third energy source 26 can be increased to match the increased feed rate, while its power density at a given point on the feedstock can be maintained by simultaneously increasing the length of the energy profile ES3 in the feed direction. In this way, a desired thermal gradient through the thickness of the wire 24 can be maintained to ensure melting without significant vaporisation of the top surface of the wire nearest the third energy source 26. Similarly, if the feed rate of the wire 24 is reduced, the power of the third energy source 26 can be decreased while simultaneously decreasing the length of the energy profile ES3 in the feed direction.

As the third energy source 26 is independently controlled from the first and second energy sources 12, 14, altering the feed rate and/or the power or shape of the energy profile ES3, does not alter other bead characteristics (e.g. SBW and CA).

Figure 4:
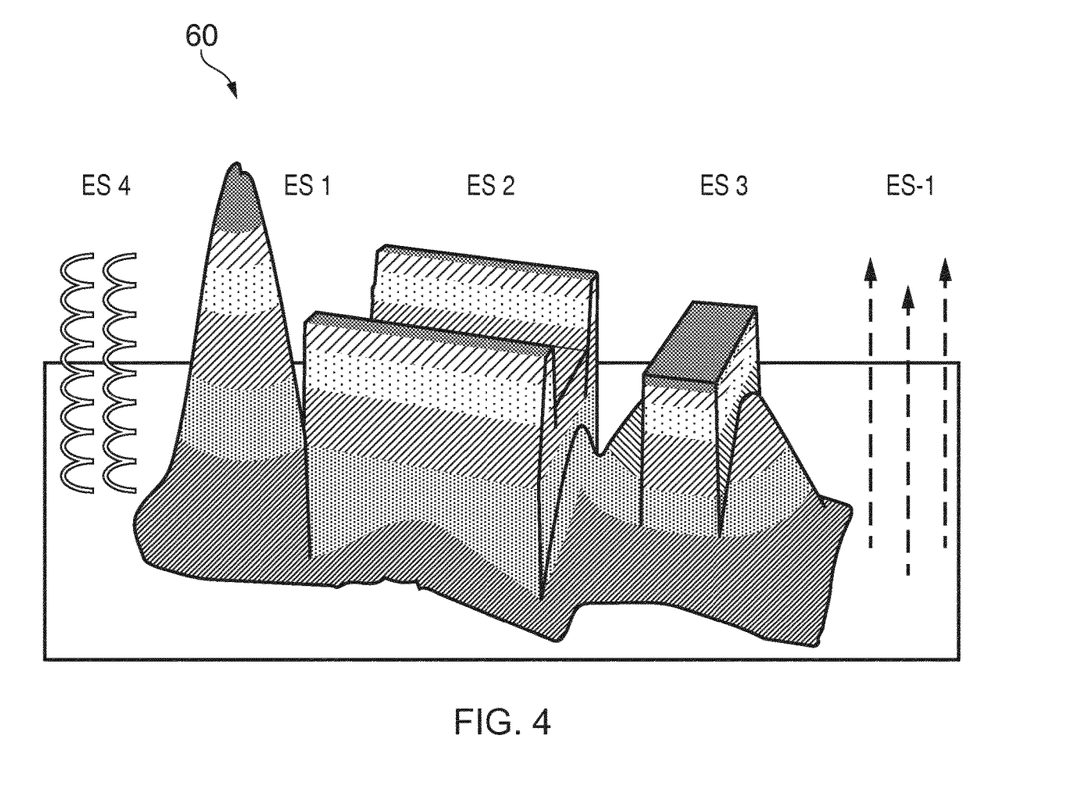
FIG. 4 shows a combined energy profile of multiple energy sources used in the system of FIG. 1 with additional process enhancements.

FIG. 4 shows the combined energy profile 40 of FIG. 2 supplemented with additional process enhancements to produce a variant combined energy profile 60 of a system for AM.

Specifically, the variant combined energy profile 60 may include active cryogenic cooling ES-1 to reduce the temperature of the already-existing part of the article (i.e. the substrate 10 or the previously formed layer) and therefore increase productivity and enhance cooling rates of the deposited material in order to improve the microstructure of the 3D article. The active cryogenic cooling ES-1 is shown directed towards the already-existing part of the article to impinge on a region trailing the moving meltpool, but can be directed anywhere on the already existing part of the article to cool the already-existing part of the article.

Additionally or alternatively, the combined energy profile 60 may include preheating via an energy source with energy profile ES4. As shown, the preheating is directed onto the substrate 10 in front of the meltpool 20, but may be directed to other locations, such as onto the feedstock. The first, second and third energy sources 12, 14, 26 may be integrated into a single delivery head controlled by the computer controller, whilst still being independently controllable.

FIGS. 1-4 show an AM system with rear feedstock addition (i.e. the wire 24 is directed towards the meltpool 20 from behind the impinging energy of the first and second energy sources 12, 14). However, the positions of the first, second and third energy sources 12, 14, 26 and the wire directing arrangement 22 can be adjusted for front or side feedstock addition.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of producing a 3D article by additive manufacture, wherein the method includes the steps of:
   forming a meltpool in an already-existing part of the article, and moving the meltpool relative thereto;
   feeding a directed feedstock into the moving meltpool to deposit and fuse a layer of material on the already-existing part; and
   repeating the forming and moving and feeding steps to build up successive layers of material, and thereby produce the 3D article; and
   wherein, in performance of the forming and moving step:
   a first energy source is directed onto the already-existing part, the first energy source impinging at a first region which moves with and leads the meltpool, whereby the first energy source initiates the formation of the meltpool, and wherein the first energy source is a plasma transferred arc;
   a second energy source is directed onto the already-existing part, the second energy source impinging at a second region which moves with and follows the first region, whereby the second energy source grows the lateral width of the meltpool before the feedstock is fed therein; and
   the energy profile of the impinging energy of the second energy source is weighted to opposite lateral sides of the meltpool.

2. The method of claim 1, wherein the second energy source is one or more lasers.

3. The method of claim 1, wherein the energy profile or the power of the impinging energy of the second energy source is adjusted to vary the lateral growth of the meltpool.

4. The method claim 1, wherein the feedstock is a wire or tape feedstock.

5. The method of claim 1 which includes the further step of:
   impinging a third energy source onto the directed feedstock to melt the feedstock as it is fed into the moving meltpool.

6. The method of claim 5, wherein the third energy source is one or more lasers.

7. The method of claim 5, wherein the energy profile of the impinging energy of the third energy source is adjusted to compensate for changes in the shape, size and/or feed rate of the feedstock.

8. The method of claim 5, wherein the power of the third energy source is adjusted to compensate for changes in the feed rate of the feedstock.

9. The method of claim 5, further including the step of preheating the feedstock.

10. A system for producing a 3D article by additive manufacture in which a meltpool is formed in an already-existing part of the article, and moved relative thereto, a directed feedstock is fed into the moving meltpool to deposit and fuse a layer of material on the already-existing part, and the forming and moving and feeding are repeated to build up successive layers of material, and thereby produce the 3D article, the system comprising:
   a first energy source configured to be directed onto the already existing part, wherein the first energy source is a plasma transferred arc;
   a second energy source configured to be directed onto the already existing part;
   a feedstock directing arrangement; and
   a computer controller adapted to control movement of the first energy source, the second energy source and the feedstock directing arrangement relative to the already-existing part such that: the first energy source impinges at a first region which moves with and leads the meltpool whereby the first energy source initiates the formation of the meltpool, the second energy source impinges at a second region which moves with and follows the first region to grow the lateral width of the meltpool before receipt of the directed feedstock into the moving meltpool, and the directed feedstock is fed into the moving meltpool;

wherein the energy profile of the impinging energy of the second energy source is weighted to opposite lateral sides of the meltpool.

11. The system of claim 10, wherein the computer controller is further adapted to adjust the energy profile and/or the power of the impinging energy of the second energy source to vary the growth of the meltpool.

12. The system of claim 10, wherein the system further comprises a third energy source, and wherein the computer controller is further adapted to control movement of the third energy source relative to the already-existing part such that the third energy source impinges the directed feedstock to melt the feedstock as it is fed into the moving meltpool.

13. The system of 12, wherein the computer controller is further adapted to adjust the energy profile of the impinging energy of the third energy source to compensate for changes in the shape and/or size of the feedstock.

14. A method of producing a 3D article by additive manufacture, wherein the method includes the steps of:
   forming a meltpool in an already-existing part of the article, and moving the meltpool relative thereto;
   feeding a directed feedstock into the moving meltpool to deposit and fuse a layer of material on the already-existing part; and
   repeating the forming and moving and feeding steps to build up successive layers of material, and thereby produce the 3D article; and
   wherein, in performance of the forming and moving step:
   a first energy source is directed onto the already-existing part, the first energy source impinging at a first region which moves with and leads the meltpool, whereby the first energy source initiates the formation of the meltpool, and wherein the first energy source is a plasma transferred arc;
   a second energy source is directed onto the already-existing part, the second energy source impinging at a second region which moves with and follows the first region, whereby the second energy source grows the lateral width of the meltpool before the feedstock is fed therein; and
   the energy profile and/or the power of the impinging energy of the second energy source is adjusted to vary the lateral growth of the meltpool.

15. A method of producing a 3D article by additive manufacture, wherein the method includes the steps of:
   forming a meltpool in an already-existing part of the article, and moving the meltpool relative thereto;
   feeding a directed feedstock into the moving meltpool to deposit and fuse a layer of material on the already-existing part; and
   repeating the forming and moving and feeding steps to build up successive layers of material, and thereby produce the 3D article; and
   wherein, in performance of the forming and moving step:
   a first energy source is directed onto the already-existing part, the first energy source impinging at a first region which moves with and leads the meltpool, whereby the first energy source initiates the formation of the meltpool, and wherein the first energy source is a plasma transferred arc; and
   a second energy source is directed onto the already-existing part, the second energy source impinging at a second region which moves with and follows the first region, whereby the second energy source grows the lateral width of the meltpool before the feedstock is fed therein; and
   wherein the method includes the further step of:
   impinging a third energy source onto the directed feedstock to melt the feedstock as it is fed into the moving meltpool.

16. A system for producing a 3D article by additive manufacture in which a meltpool is formed in an already-existing part of the article, and moved relative thereto, a directed feedstock is fed into the moving meltpool to deposit and fuse a layer of material on the already-existing part, and the forming and moving and feeding are repeated to build up successive layers of material, and thereby produce the 3D article, the system comprising:
   a first energy source configured to be directed onto the already-existing part, wherein the first energy source is a plasma transferred arc;
   a second energy source configured to be directed onto the already-existing part;
   a feedstock directing arrangement; and
   a computer controller adapted to control movement of the first energy source, the second energy source and the feedstock directing arrangement relative to the already-existing part such that: the first energy source impinges at a first region which moves with and leads the meltpool whereby the first energy source initiates the formation of the meltpool, the second energy source impinges at a second region which moves with and follows the first region to grow the lateral width of the meltpool before receipt of the directed feedstock into the moving meltpool, and the directed feedstock is fed into the moving meltpool;
   wherein the computer controller is further adapted to adjust the energy profile and/or the power of the impinging energy of the second energy source to vary the growth of the meltpool.

17. A system for producing a 3D article by additive manufacture in which a meltpool is formed in an already-existing part of the article, and moved relative thereto, a directed feedstock is fed into the moving meltpool to deposit and fuse a layer of material on the already-existing part, and the forming and moving and feeding are repeated to build up successive layers of material, and thereby produce the 3D article, the system comprising:
   a first energy source configured to be directed onto the already-existing-pa part, wherein the first energy source is a plasma transferred arc;
   a second energy source configured to be directed onto the already-existing part;
   a feedstock directing arrangement;
   a computer controller adapted to control movement of the first energy source, the second energy source and the feedstock directing arrangement relative to the already-existing part such that: the first energy source impinges at a first region which moves with and leads the meltpool whereby the first energy source initiates the formation of the meltpool, the second energy source impinges at a second region which moves with and follows the first region to grow the lateral width of the meltpool before receipt of the directed feedstock into the moving meltpool, and the directed feedstock is fed into the moving meltpool; and
   a third energy source;

wherein the computer controller is further adapted to control movement of the third energy source relative to the already-existing part such that the third energy source impinges the directed feedstock to melt the feedstock as it is fed into the moving meltpool.

* * * * *